(12) United States Patent
Burchell et al.

(10) Patent No.: US 7,982,622 B2
(45) Date of Patent: Jul. 19, 2011

(54) APPARATUS AND METHOD FOR MONITORING AND COMMUNICATING DATA ASSOCIATED WITH A PRODUCT

(75) Inventors: Jonathan Burchell, Essex (GB); Therese E. Myers, Oxnard, CA (US); Stanton Kaye, Oxnard, CA (US); Gary W. Pope, Calabasas, CA (US); Fred Eversley, New York, NY (US); Michael Patterson, Oxnard, CA (US); Kenji Ono, Ventura, CA (US)

(73) Assignee: Infratab, Inc., Oxnard, CA (US)

( * ) Notice: Subject to any disclaimer, the term of this patent is extended or adjusted under 35 U.S.C. 154(b) by 0 days.

(21) Appl. No.: 12/832,855

(22) Filed: Jul. 8, 2010

(65) Prior Publication Data
US 2010/0271184 A1 Oct. 28, 2010

Related U.S. Application Data

(63) Continuation of application No. 11/655,860, filed on Jan. 19, 2007, now Pat. No. 7,764,183, which is a continuation-in-part of application No. 11/112,718, filed on Apr. 22, 2005, now Pat. No. 7,495,558.

(60) Provisional application No. 60/566,019, filed on Apr. 27, 2004.

(51) Int. Cl.
*G08B 17/00* (2006.01)
(52) U.S. Cl. ............... 340/585; 340/505; 340/539.26; 340/572.1; 340/10.1; 340/309.16; 700/224; 700/225
(58) Field of Classification Search ............ 385/585, 385/505, 539.26, 572.1, 10.1, 309.16; 700/224, 700/225
See application file for complete search history.

(56) References Cited

U.S. PATENT DOCUMENTS

| 3,967,579 A | 7/1976 | Seiter |
| 4,057,029 A | 11/1977 | Seiter |
| 4,277,974 A | 7/1981 | Karr |
| 4,384,288 A | 5/1983 | Walton |

(Continued)

FOREIGN PATENT DOCUMENTS
EP 0 837 412 A2 4/1998

OTHER PUBLICATIONS

Michael E. Raynor, RFID and Disruptive Innovation, RFID Journal, Oct. 2004, pp. 27-42.

(Continued)

*Primary Examiner* — Davetta W Goins

(57) ABSTRACT

Visual and audio communication interface for a perishable integrity indicator system which includes a RFID transponder and perishable integrity sensor. A perishable integrity indicator system includes a RFID transponder and a perishable integrity sensor. The RFID transponder includes a RF integrated circuit coupled with an antenna. The sensor monitors the time and temperature of the perishable. A freshness determining module receives time- and temperature-dependent measurement data from the perishable integrity sensor and determines a current freshness status. A communications interface to the RFID transponder permits a RFID reader to retrieve current freshness status data corresponding to the freshness status determined by the freshness determining module. The system further includes a power management module. The visual and audio communication interface provides a communications means for sending sensor alerts, sensor setup and history as either a supplement to the RF communication or as an alternative to RF when RF is either not available or not able to communicate.

37 Claims, 9 Drawing Sheets

U.S. PATENT DOCUMENTS

| | | |
|---|---|---|
| 4,388,524 A | 6/1983 | Walton |
| 4,546,241 A | 10/1985 | Walton |
| 4,580,041 A | 4/1986 | Walton |
| 4,746,823 A | 5/1988 | Lee |
| 4,823,108 A | 4/1989 | Pope |
| 4,857,893 A | 8/1989 | Carroll |
| 4,868,525 A | 9/1989 | Dias |
| 5,193,056 A | 3/1993 | Boes |
| 5,214,409 A | 5/1993 | Belgel |
| 5,237,669 A | 8/1993 | Spear et al. |
| 5,367,658 A | 11/1994 | Spear et al. |
| 5,430,441 A | 7/1995 | Bickley et al. |
| 5,442,669 A | 8/1995 | Medin |
| 5,491,482 A | 2/1996 | Dingwall et al. |
| 5,519,381 A | 5/1996 | March et al. |
| 5,528,222 A | 6/1996 | Moskowitz et al. |
| 5,563,928 A | 10/1996 | Rostoker et al. |
| 5,564,926 A | 10/1996 | Branemark |
| 5,572,169 A | 11/1996 | Iwamoto |
| 5,640,687 A | 6/1997 | Meron et al. |
| 5,649,295 A | 7/1997 | Shober et al. |
| 5,745,036 A | 4/1998 | Clare |
| 5,802,015 A | 9/1998 | Rothschild et al. |
| 5,809,518 A | 9/1998 | Elliott et al. |
| 5,835,553 A | 11/1998 | Suzuki |
| 5,847,705 A | 12/1998 | Pope |
| 5,850,187 A | 12/1998 | Carrender et al. |
| 5,963,105 A | 10/1999 | Nguyen |
| 5,964,134 A | 10/1999 | Bowers et al. |
| 6,003,115 A | 12/1999 | Spear et al. |
| 6,006,247 A | 12/1999 | Browning et al. |
| 6,012,057 A | 1/2000 | Mayer et al. |
| 6,023,712 A | 2/2000 | Spear et al. |
| 6,025,780 A | 2/2000 | Bowers et al. |
| 6,094,138 A | 7/2000 | Eberhardt et al. |
| 6,100,804 A | 8/2000 | Brady et al. |
| 6,112,275 A | 8/2000 | Curry et al. |
| 6,116,505 A | 9/2000 | Withrow |
| 6,122,704 A | 9/2000 | Hass et al. |
| 6,147,605 A | 11/2000 | Vega et al. |
| 6,160,458 A | 12/2000 | Cole et al. |
| 6,217,213 B1 | 4/2001 | Curry et al. |
| 6,232,870 B1 | 5/2001 | Garber et al. |
| 6,275,779 B1 | 8/2001 | Pohle et al. |
| 6,285,282 B1 | 9/2001 | Dorenbosch et al. |
| 6,294,997 B1 | 9/2001 | Paratore et al. |
| 6,326,892 B1 | 12/2001 | De La Forterie |
| 6,351,406 B1 | 2/2002 | Johnson et al. |
| 6,376,284 B1 | 4/2002 | Gonzalez et al. |
| 6,476,682 B1 | 11/2002 | Cole et al. |
| 6,476,716 B1 | 11/2002 | Ledlow |
| 6,545,938 B2 | 4/2003 | Lee et al. |
| 6,593,845 B1 | 7/2003 | Freedman et al. |
| 6,671,358 B1 | 12/2003 | Seidman et al. |
| 6,712,276 B1 | 3/2004 | Abali et al. |
| 6,720,866 B1 | 4/2004 | Sorrells et al. |
| 6,795,376 B2 | 9/2004 | Quine |
| 6,806,698 B2 | 10/2004 | Gauthier et al. |
| 6,826,119 B2 | 11/2004 | Fortune |
| 6,857,566 B2 | 2/2005 | Wankmueller |
| 6,860,422 B2 | 3/2005 | Hull et al. |
| 6,863,377 B2 | 3/2005 | Walker et al. |
| 6,927,687 B2 * | 8/2005 | Carrender ............... 340/539.26 |
| 6,950,028 B2 | 9/2005 | Zweig |
| 7,495,558 B2 | 2/2009 | Pope et al. |
| 2002/0085453 A1 | 7/2002 | Fortune |
| 2004/0212509 A1 | 10/2004 | Zweig |
| 2007/0001862 A1 | 1/2007 | Zweig |

OTHER PUBLICATIONS

Ann Grackin, A Midsize Approach to FRID, RFID Journal, Oct. 2004, p. 43.

\* cited by examiner

APPARATUS AND METHOD FOR MONITORING AND COMMUNICATING DATA ASSOCIATED WITH A PRODUCT

RELATED APPLICATIONS

This application claims the benefit of priority to and is a continuation of U.S. patent application Ser. No. 11/655,860 file don Jan. 19, 2007 now U.S. Pat. No. 7,764,183 (the "'860 application"), which is a continuation-in-part of U.S. patent application Ser. No. 11/112,718 filed on Apr. 22, 2005 (the "'718 application") (now U.S. Pat. No. 7,495,558), which claims the priority of U.S. Provisional Patent Application No. 60/566,019 filed on Apr. 27, 2004 (the "'019 application"). This application claims priority to the '860, '718 and '019 applications, which are hereby incorporated by reference.

FIELD OF THE INVENTION

The invention relates to an apparatus an a method for monitoring and communicating data associated with a product. More particularly, the invention relates to RF smart labels and related sensors, software and processes that may be used for monitoring, analyzing and communicating product data, such as "freshness", perishability, and/or time/temperature data.

BACKGROUND

Perishable products, such as chilled and minimally processed food products, vaccines, pharmaceuticals, blood, film, chemicals, adhesives, paint, munitions, batteries, soft drinks, beer, cosmetics and many other products, each have a unique shelf-life. Product quality is affected by a number of factors that may be physical, chemical or biological in nature, and that act together in often complex and interconnected ways. Temperature is usually a significant factor determining the longevity of quality. Sensors have been proposed to monitor and report the "shelf-life" or integrity of a product (e.g. how well the quality of the product has been maintained over time). U.S. patent application Ser. No. 11/112,718 (the '718 application), which is assigned to the present assignee and which is incorporated herein by reference, describes a class of sensors that utilize RF technology for communicating precise, temperature-dependent, shelf-life and other time-dependent sensor monitoring of perishable products. The sensors may operate in conjunction with RF transponders (also known as RFID or radio frequency identification devices), such as those used for tracking and tracing products. For example, the sensors may be directly or indirectly coupled to and/or integrated with an RF transponder.

SUMMARY OF THE INVENTION

Embodiments of the present invention combine digital sensing and RFID technology for input and output of sensing data. This makes possible a new class of sensors, including sensors that monitor and report the integrity of a product (e.g., how well the quality of the product has been maintained). Embodiments of the present invention add an alternate visual and/or audio communication interface to RF digital sensors for the purpose of communicating shelf-life and sensor data. This alternate visual/audio communication interface may be used to set-up and configure the sensor when an RF reader is not present, to locate a product or container in various situations, including those where the RF reader may not be working properly, offload sensor data in situations where RF readers are not present, and in situations where the amount of sensor data is communicated faster in a non-RF manner. For example, embodiments may use user-activated push buttons, RF commands, sensor software automatic activation or visual/audio remote control to activate and deactivate visual and/or audio communication.

In one embodiment of the invention, the sensor may use LEDs to signal shelf-life status, respond to a "where are you" location request or set up a visual signaling scheme to receive or transmit sensor data.

In another embodiment of the invention, a visual display, such as an LED, LCD, or OLED, provides a specific number of different signaling schemes, based upon pulse length and pattern that generate a time domain pulse sequence, Morse code, or other coding algorithm. The signaling schemes may be used to signal shelf-life status or product information, respond to a "where are you" location request or send and receive shelf-life setup or history data. Alternatively, a sensor may use different types of audio sounds signal to shelf-life status, product information and alerts, and/or respond to a "where are you" location request.

In another embodiment, a sensors may use visual displays and audible signals to transmit information to a user indicative of two or more types of product data, such as data identifying a type of product and data relating to the freshness, perishability and/or shelf-life of the product. Visual and audible indicators may signal early warning alerts or specific information (for example, by use of color or dot-dash type coding). When an RF sensor/indicator is enhanced with visual/audio signaling systems, the sensor data can be communicated to a user or a remote visual/audio receiver when RF readers are not available, when RF performance is low, when data to be communicated by the sensor is extensive and when a particular tagged item needs to be located.

In another embodiment, an elongated smart label or "long tag" includes an extended interface between the antenna/RFID device and the sensor module, including a pair of inductors. The long tag provides a solution that allows a user to position the sensor module inside a package while positioning the antenna and/or RFID device outside of the package for RF reception. For best RFID performance and because standard RFID tags often include shipping or product identification data and/or barcodes, RFID labels may be adhesively attached to the outside of the tagged case. Placing the sensor module inside a package, such as a cold box, while allowing the antenna to reside outside of the package provides various advantages. For example and without limitation, the long tag allows for optimal sensing and RF reception when used together with temperature sensitive goods that are placed in a container lined with metal and/or containing ice or dry ice packs, which could reduce RFID read performance. In one embodiment, the power supply or battery is placed near the antenna, remote from the sensor module. This allows the battery to reside outside of a container, thereby eliminating a risk that cold or freezing temperatures cause battery voltage to drop. Additionally, a long tag could be used to sense the temperature of cases located in the middle of a pallet.

According to one aspect of the invention, a sensor is provided for monitoring and communicating data related to a perishable item. The sensor is adapted to operate with an RFID device including an antenna for receiving signals from an RF reader. The sensor includes a sensor module that monitors time and temperature of a perishable item, that determines a current freshness status based on the time and temperature, and that selectively transmits data representing the freshness status. The sensor further includes a communication interface with the RFID device. The interface allows an RFID reader to retrieve data representing the freshness status from the sensor module, and allows the sensor module to detect activation of the RFID device. An indicator is communicatively coupled to the sensor module. The indicator is adapted to selectively activate and communicate the freshness status by use of a humanly perceivable signal under control of the sensor module. The sensor module is adapted to selectively activate the indicator in response to detecting activation of the RFID device.

According to another aspect of the invention, a method is provided for locating a perishable item by use of an identification signal generated from an RFID reader. The method includes providing a smart label that is attachable to a container including the perishable item. The smart label includes an RFID device and a sensor module that is communicatively coupled to the RFID device. The sensor module includes an indicator for generating a humanly perceivable signal. The method further includes receiving an identification signal from an RFID reader, detecting receipt of an identification signal by the RFID device by use of the sensor module; and causing the indicator to generate a humanly perceivable signal in response to the detected receipt of the identification signal.

Other features are described and claimed below and/or are apparent from the drawings.

DETAILED DESCRIPTION OF THE PREFERRED EMBODIMENTS

Embodiment of the present invention will now be described in detail with reference to the drawings, which are provided as illustrative examples of the invention so as to enable those skilled in the art to practice the invention. Notably, the implementation of certain elements of the present invention may be accomplished using software, hardware, firmware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Preferred embodiments of the present invention are illustrated in the Figures, like numerals being used to refer to like and corresponding parts of various drawings.

Embodiments of the invention are described below relating to RF smart labels, tags and sensors, software and processes particularly for monitoring and analyzing the shelf-life of a perishable product. For example, the labels, tags and sensors may be used to indicate the "freshness", perishability or "shelf-life" of an item, and/or to provide logistics and inventory management to RFID tracking and tracing of products. The '718 application, which has been incorporated by reference, describes labels, tags and sensors that can be used to implement the present invention.

Figure 1:
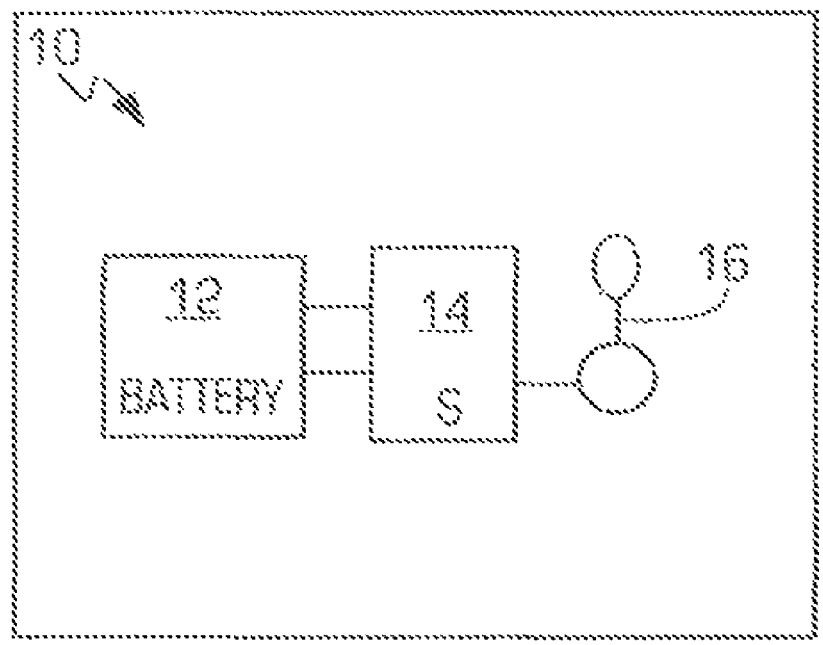
FIG. 1 schematically illustrates a sensor adapted to communicate data associated with a product according to one embodiment of the invention.

FIG. 1 illustrates one embodiment of a shelf-life sensor 10, according the present invention. The sensor includes a power supply or battery 12, a sensor module 14, and a indicator/switch 16. The sensor module 14 is coupled to and receives electrical power from battery 12, which may comprise a coin cell, flexible battery or other relatively thin power supply. The sensor module 14 may include sensor logic, such as a conventional processor chip and/or circuitry, a memory module for storing data, such as data related to a perishable item or product, freshness data, or data representing one or more predefined temperature-dependent shelf-life trends, and a sensor component adapted so sense and/or detect temperature and/or other product parameters. The sensor logic or processing circuitry can compare data received from the sensor component to trend data in memory to determine the freshness, perishability or shelf-life of a particular product. This may be performed in the manners described in the '718 application and/or U.S. Pat. No. 5,442,669 (the "'669 patent"), which is assigned to the present assignee and which is incorporated herein by reference. In alternate embodiments, the sensor module 14 may use external memory, such as the memory contained in an RFID device, to store product data and sensor measurements.

The sensor module 14 preferably includes a conventional interface for communicatively coupling the module 14 to an RF transponder, as discussed in greater detail below in reference to FIGS. 2-4. Particularly, the sensor module 14 may be used in conjunction with a RF transponder or other radio frequency identification (RFID) system used to communicate data, locate, track and trace products or monitor an environment. The sensor module 14 may also be used in conjunction with an RF communication interface such as Bluetooth or Zigbee. The sensor module 14 is further coupled to the indicator/switch 16 and can selectively signal indicator/switch 16 in order to activate/deactivate (turn on and off) the indicator. In one embodiment, the structure of sensor module 14 may include structures substantially similar to the sensor chips described in the '718 application.

The indicator/switch 16 may be communicatively coupled to the sensor module 14 and may receive electrical power from battery 12. The indicator/switch 16 may include a LED, OLED, LCD, light or other visual, audio or otherwise humanly perceivable sensory indicator for providing information regarding a monitored product and/or the "freshness" of the product that is being monitored. For example, the indicator/switch 16 may comprise a multi-colored display (e.g., LED or LCD) adapted to generate a different color based on a particular signal. In one embodiment, the indicator/switch 16 may also include a conventional electrical or capacitive switch for selectively activating the display and/or the sensor module 14, for example, by manually depressing the indicator/switch 16. The switch and display elements may be separate devices that are communicatively coupled together. Alternatively, the switch and display elements may comprise a single integrated component. For example, the indicator/switch 16 may be constructed in a "stacked" configuration, including a transparent cover or membrane, a visual indicator (e.g., an LED) located below the membrane, and electrical switching circuitry below the indicator. When the membrane is depressed, the switching circuitry closes, which "wakes up" or activates the sensor module 14 and/or display. For example, the sensor may be shaped like a dot, approximately 3-6 millimeters in diameter, folded, with two or more layers of stacked electronics, one of which is a switch, and one of which is a display (or audio), so that when touched it flashes back in one or more colors, or in a dot-dash code or by RF, or other form of communication to an acceptable reader, human, machine or otherwise. In an alternate embodiment, display 16 may be replaced by and/or comprise an audible indicator, for example, a low power audible oscillator that generates humanly perceivable sound.

Figure 10A:
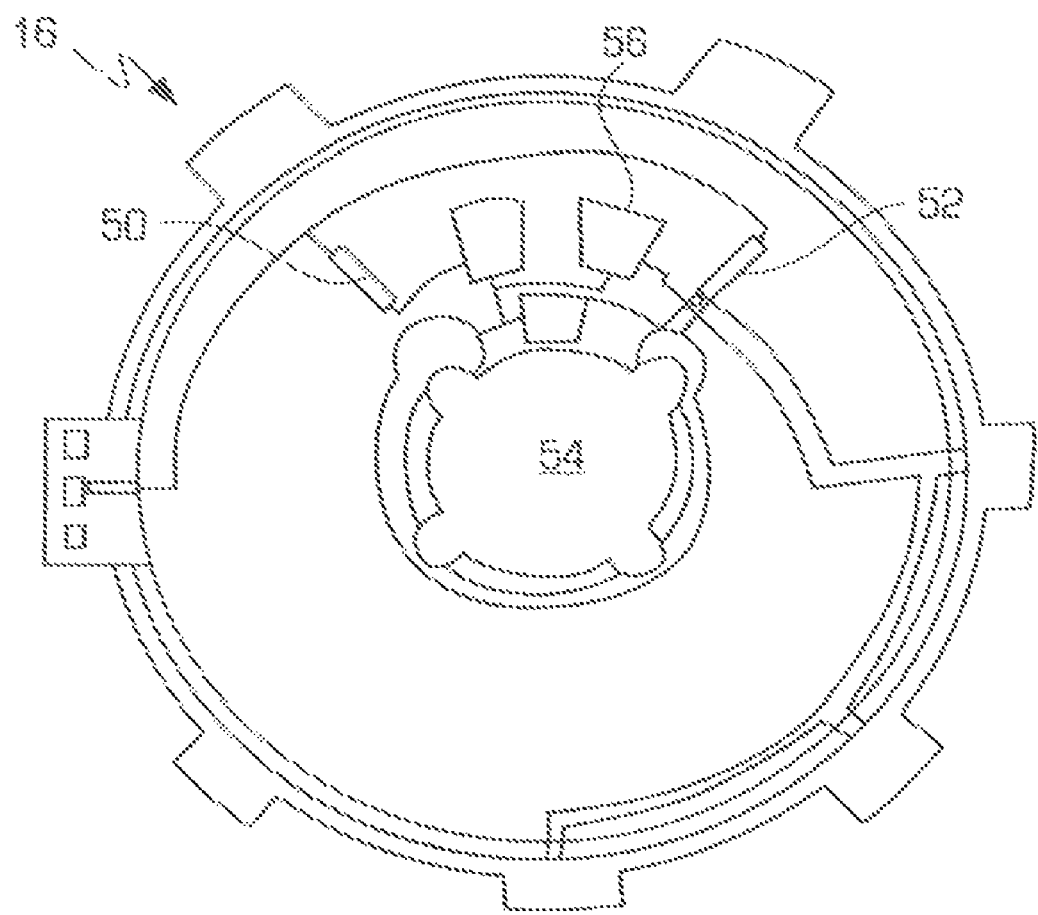
FIGS. 10A and 10B respectively illustrate a plan view and an elevation view of an embodiment of a display/switch that may be used with the RFID sensors of the present invention.
Figure 10B:
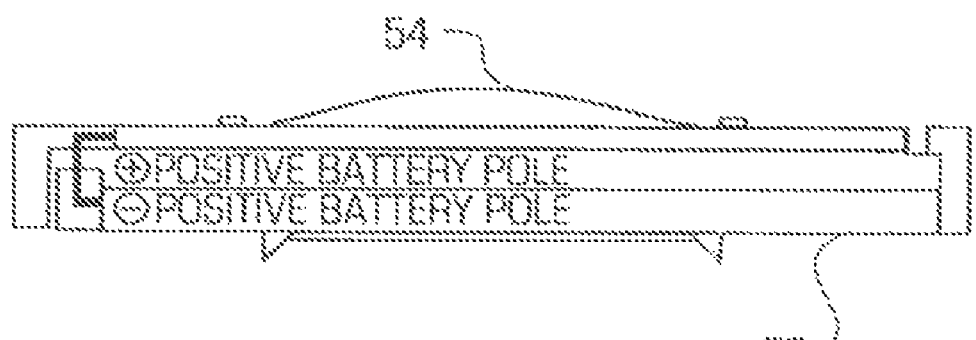
Figure 11A:
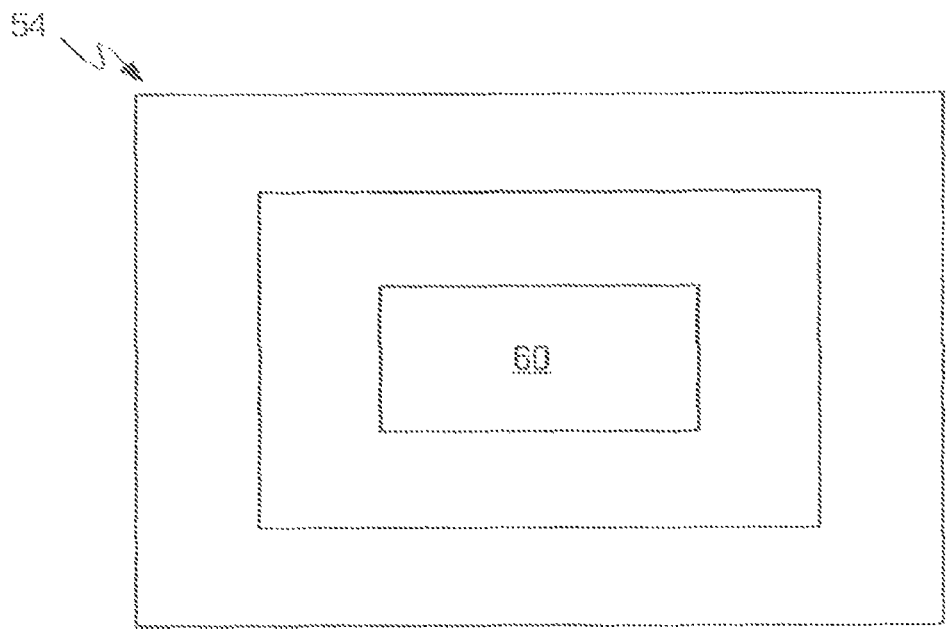
FIGS. 11A-11D show an embodiment of a push-button switch that may be used with the display/switch shown in FIGS. 10A, 10B and the RFID sensors of the present invention.
Figure 11B:
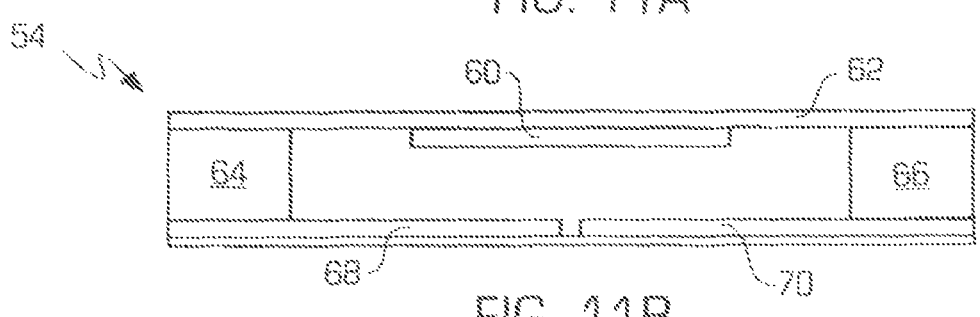
Figure 11C:
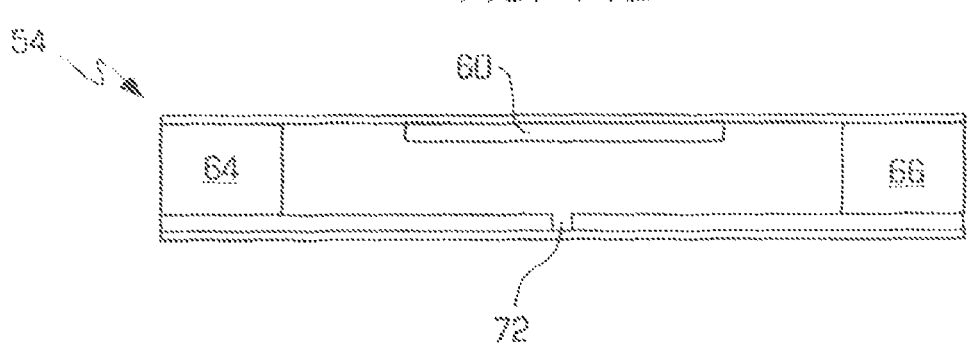
Figure 11D:
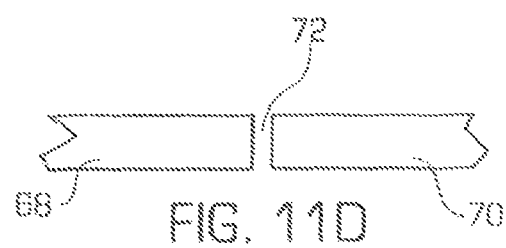

FIGS. 10A and 10B illustrate one embodiment of a display/switch 16. Display/switch 16 includes a pair of LEDs 50, 52, which may comprise red and green LEDs, respectively, and a push-button switch 54. Integrated circuitry 56 controls the operation and/or activation of LEDs 50, 52. The LEDs 50, 52, switch 54 and integrated circuitry 56 is electrically coupled to the positive and negative poles of a thin battery cell 58. The LEDs 50, 52, switch 54, and integrated circuitry 54 may be preferably adhered to the battery cell using a conventional adhesive.

FIGS. 11A-11D show one embodiment of a push-button switch 54 that may be used with the display/switch 16. The button can be dispensed using a standard machine tape. The button includes a conductive member 60 that is attached to the top substrate or tape portion 62. A pair of adhesive spacers 64, 66 adhere to the substrate 62 and hold the conductive member away from the conductive leads 68, 70 below. The conductive leads 68, 70 are separated by a small switch gap 72. When the button is depressed, the conductive member 60 is placed in contact with conductive leads 68, 70. This forms and electrical connection between the leads and closes the circuit.

The sensor 10 is preferably embodied in a substantially planar label that may be attached to affected or perishable products in order to monitor the product integrity, usability and safety of a product or an environment. In the case of perishable products, the sensor modules 14 may include conventional temperature, shelf-life (the integration of time and temperature), humidity, vibration, shock and other sensors that determine how well the quality of a perishable has been maintained, such as the sensors described in the '718 application and/or the '669 patent. In the case of non-perishable products, sensors may include the above mentioned sensors plus product specific sensors that monitor the wear and tear on a particular product.

In one embodiment, sensor 10 comprises a smart label that is adapted to be attached to a product or container and that monitors temperature and time. For example, the sensor may sense and integrate temperature over time while referencing a data table containing the shelf-life parameters for a tagged product, as may be previously provided or understood by a perishable producer. These shelf-life parameters and determinations may include calculations based upon Arrhenius equations with additional refinements, depending upon the quality concerns of the perishable producer. The result is a customized, product-specific, real-time indicator of shelf-life left and/or shelf-life history.

In one embodiment, the sensor 10 generates a visible and/or audible signal that has a frequency, duration and/or periodic characteristic that varies based on one or more factors. For example, the sensor 10 may generate one or more periodic signals representative of at least two factors, such as type of product and its freshness. A first factor may include, for example, a type or classification of an item used to identify it by type or general class of products or goods. A second factor may include a freshness of that particular product or good. Preferably, the freshness is determined by the sensor module 14 in the manner described in the '718 application. The sensor module 14 can communicate signals to the indicator/switch 16 in order to visually and/or audibly indicate the freshness of the product.

As an example of a visual indicator, a green dot generated by the display 16 (e.g., an LED) may indicate a fresh product, while a red dot may indicate a spoiled product. The same dot may flash with a period of one second, so that it is illuminated for a half second and off for a half second periodically, to indicate a particular produce type. A different produce type may have a period of two seconds, and a medicine type may have a period of three seconds.

This signaling scheme may also be reversed, so that the dot illuminates for a duration corresponding to the freshness of the product, e.g., longer duration for fresher product. For example, a green dot may indicate produce type A, a red dot produce type B and a yellow dot for medicine product. The display may generate a periodic flashing green light to indicate a "freshness" percentage or shelf-life of the product. For example, the longer the period that the green light flashes, the shorter the shelf-life of the product. Alternatively, the sensor may use a code may to communicate the percentage of the shelf-life remaining or the number of days remaining. For example, three-second periods may comprise months, two-second periods may comprise weeks, and one-second periods may comprise days. In this example, a three-second flash, followed by three one-second flashes, would represent a month and three days of shelf-life. In an alternate embodiment, the display includes both dashes and dots for communicating information relating to product type and shelf-life using a code, for example, Morse code.

As an example regarding audible signals, a high pitch sound may indicate a fresh product, while a lower pitch sound may indicate a spoiled product. The same dot may sound-off for a predetermined time period (e.g., one second), so that it generates sound for a first predetermined time (e.g., a half second) and is silent for a second predetermined time (e.g., a half second), to indicate a particular produce type. A different produce type may have a different period (e.g., two seconds), and a medicine type may have another period (e.g., three seconds). These may be reversed, so that the sound is heard for a duration corresponding to the freshness of the product, e.g., longer duration for fresher product. Alternatively, different sound types could be used, such as a B flat tone to indicate produce type A, a C sharp tone for produce type B, and a D flat tone for a medicine product.

Figure 2:
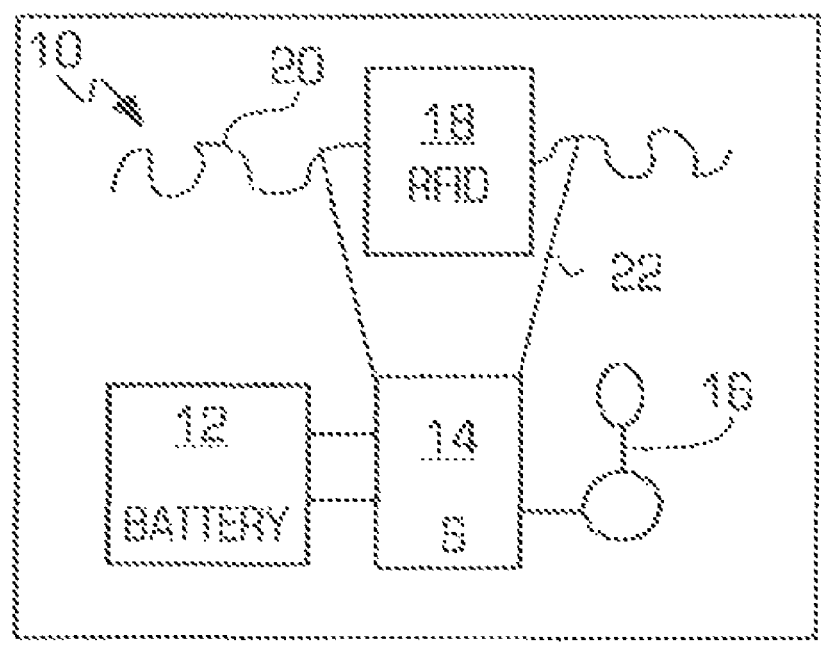
FIG. 2 schematically illustrates an RF sensor having a direct sensor-to-antenna connection according to another embodiment of the invention.
Figure 3:
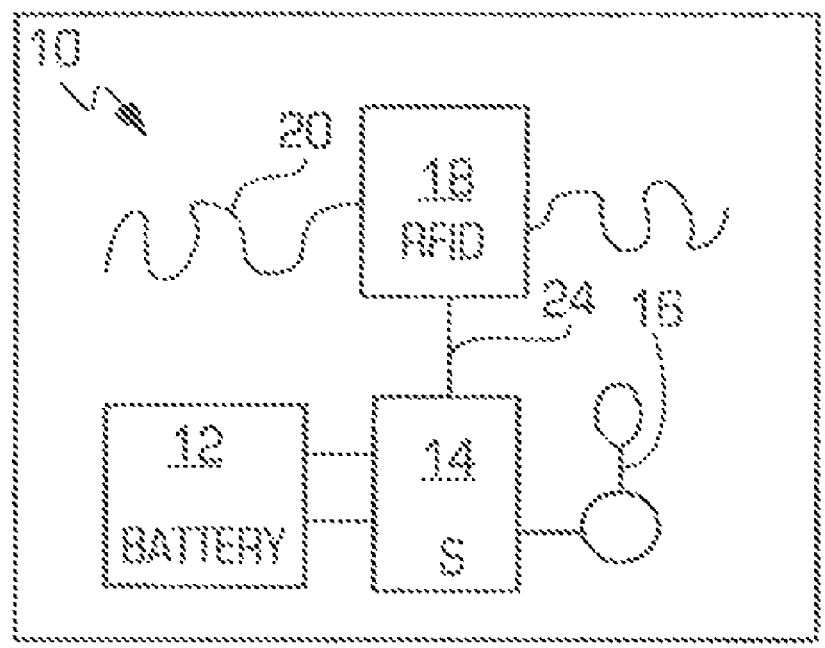
FIG. 3 schematically illustrates a semi-passive RF sensor having a serial interface between sensor and RFID components according to another embodiment of the invention.
Figure 4:
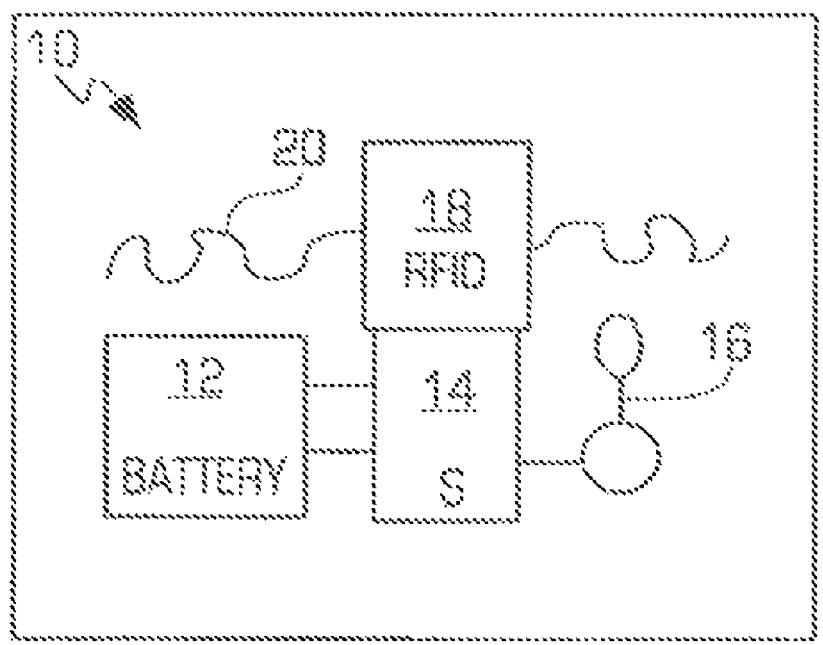
FIG. 4 schematically illustrates an active integrated sensor and RFID module according to another embodiment of the invention.

Referring now to FIGS. 2-4, the sensor 10 may be communicatively coupled to an RFID device or RF transponder 18, which may comprise a conventional RFID integrated circuit. In one embodiment, the sensor 10 and RFID 18 may be integrated within a single device. In the embodiment shown in FIG. 2, the sensor module 14 has the ability to connect to transponder 18 via a direct current connection 22 to the transponder's antenna 20. In the embodiments shown in FIGS. 3 and 4, the sensor module 14 connects to the transponder 18 via a one- or two-wire interface 24, respectively. The transponder 18 assigns a predetermined amount (e.g., 32 bits) of user read/write memory exclusively to the sensor. The sensor may use this designated RF transponder memory to report sensor status and alerts, to generate a particular indication signal by use of indicator/switch 16, and to send/receive sensor commands to/from an RF reader.

In the case of a multi-chip RF tag, the tag's circuit architecture supports an RFID transponder chip with support for either a direct current connection to the RF antenna (FIG. 4) or for a one- or two-wire serial interface to a sensor integrated circuit (FIGS. 2-3), and a predetermine amount of read/write user memory. One or more sensor integrated circuits provide sensing, sensing power management, sensing data memory management and RF detection/interface to the RFID transponder. The system preferably includes a battery 12 for powering the sensor(s) and optionally enhancing the communication signal when sensor data is sent to an RF reader (although the system may also be passively configured). The battery also can be used to support the initiation of RF communication by the sensor.

The system includes a communication interface preferably having the following features. First, it is configured to provide notification to the sensor 10 that data or commands are being sent by an RF reader or other RF device including another sensor. The notification may be provided from the RF transponder 18 or from circuitry in the sensor 10 that is watching the RF data for sensor commands. The commands may include a command from an RFID reader that corresponds to a particular RFID device. Alternatively, a sensor identifier command could be used that identifies a specific sensor using a identification code or serial number. The sensor identification may also be associated with a container, product, or item. The interface may also be configured with the ability for the sensor, as part of its sensing operation, to store sensor status and alert data into designated RF transponder memory. The interface preferably may also have the ability for the sensor and the RF reader or other RF device to send/receive commands and data using designated RF transponder memory. In one embodiment, the interface has the ability for the sensor to bypass the RF transponder memory and to establish a direct path from the RF reader to the sensor for the purpose of initial sensor configuration and for downloading sensor history.

Figure 5:
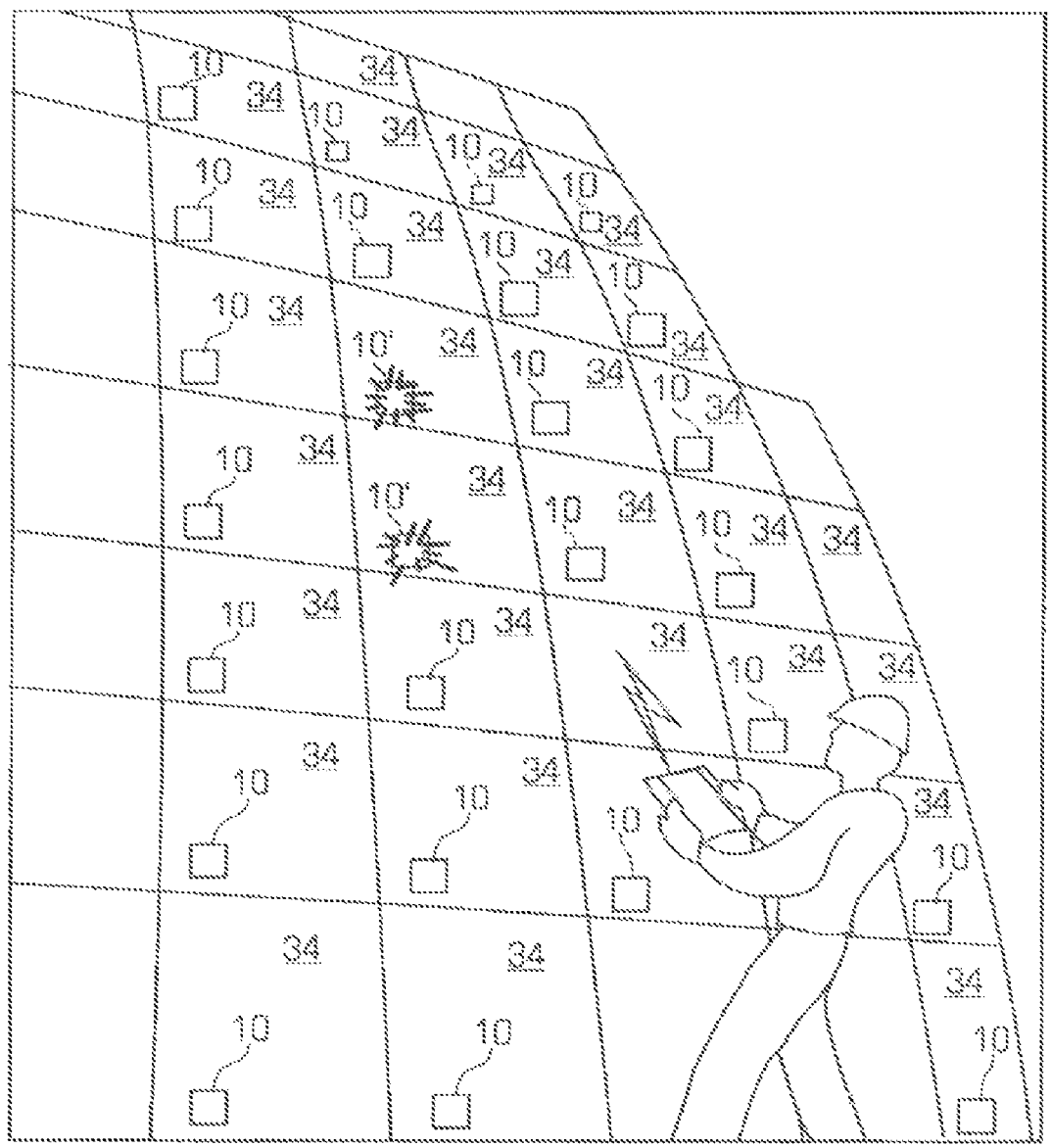
FIG. 5 illustrates a user using an RFID sensor to locate a particular container according to one embodiment of the invention.

In operation, the smart labels 10 may be used to selectively and remotely locate a particular product or container and obtain data relating to that product or container. FIG. 5 shows a collection of containers 34 that may reside, for example, in a storage facility or warehouse. In this example, a user 30 having an RFID 32 reader can quickly and easily locate a particular container. The user 30 enters into the reader 32 an RF identification command (e.g., a "where are you?" command), which is associated with the RFID corresponding to the product that the user would like to locate. Reader 32 transmits the identification command via an RF signal toward the collection of containers 34. The RFID devices 18 in smart labels 10 receive the RFID signals including the identification command. The specific RFID device corresponding to the identifier can detect the command and activate in response. The RFID devices not associated with the particular identifier take no action. The sensor 10' that is coupled to the activated RFID device detects the command and/or the activation of the RFID device and, in response, sends a command to indicator/switch 18. The command causes indicator/switch 18 to flash and/or illuminate and/or in the case of an audible indicator, to generate an audible tone. The flashing display 18 and/or audible tone allow the user 30 to visually and/or audibly locate the desired product. In one embodiment, the sensor 10' will also communicate its freshness data in response to detecting the command. For example, the command may cause the sensor 10' to activate in the following manner: i) flash in a predetermined manner (e.g., a location sequence) to allow a user to locate the container/product; ii) pause for a predetermined period of time; and iii) flash in a manner that communicates freshness data and/or product information. In an alternate embodiment, a user 30 may enter a separate command into the RFID reader 32 to cause the sensor 10' to display its freshness information. Alternatively, when the smart label is enumerated by the RFID signal, the sensor module may chooses at random one of the visual signaling schemes or may be instructed by the RF reader which visual signaling scheme to use. The smart label may then sends sensor data to a conventional visual receiver or vision system in the visual communication scheme chosen. By using signaling schemes, the vision reader can handle partial or zero visual data. It should be understood that the particular examples discussed in this paragraph are in no way limiting and any suitable command, command sequence and/or command structure can be used to trigger a particular sensor 10' or its associated product and/or container, and to communicate data regarding the product.

The visual/audible indicators of the foregoing embodiments may also enable visual and audio communications to replace or supplement RF communications by using signaling schemes to transmit data either to a user or to a special reader, such as one or more conventional vision systems, photodetectors, pattern detectors, luminance detectors, or sound detectors. For example, a visual signal may comprise a flash of a dot or a sequence of flashes of a suitable length of time sufficient for a vision system to read the data. This data can communicate descriptive features of a product or condition, such as data the percentage of remaining shelf-life (100%, 85%, 50%), specific alert conditions (temperature has exceeded 8 C for 20 sensing periods), and the like.

Visual data that a vision system receives may be converted and/or reformatted so that it is compatible with data received from the perishable indicator by an RFID reader. For example, the conversion may allow the visual data to be incorporated into the supply chain and cold chain information systems used by RF readers. This visual data may be noted as visual data received, such as the ID of the visual receiver, location, time and other information tracked in RFID systems.

The visual/audible indicators of the foregoing embodiments further enable visual and audio communications to be initiated by an RF command sent to the perishable indicator by an RF reader to either locate a tagged item or to initiate a visual/audio communication link for the purpose of transmitting data to and from the perishable indicator. Data transmitted to the sensor can be shelf-life data about a product to be tagged, information about a shipment, a batch lot number, quality inspection data or change of custody information. Data transmitted from the perishable indicator can be a temperature or shelf-life log or other sensor data collected by the sensor such as humidity.

In one embodiment, a smart label 10 may be adapted to respond to and communicate with an RF reader that is shared at a checkpoint for invoicing, billing or the like. The items passing through the reader might be prompted by the reader to communicate their freshness data to the reader. A textual, colored or shaped indicia of shelf-life, being either a symbol or index of such, could be added to line items regardless of Uccnet or EAn or ECP Global or other codes. In this manner, by viewing a checkout or an inventory display screen, the reader display, or a summary paper receipt, an ordinary employee or end customer could view the "freshness" or perishability of various items. Such an additional readout in the case of perishables permits an additional benefit in the perception of merchandise quality. In one embodiment, this read out may be used in lieu of a visual tag display to reduce the need for power to operate a tag display (or the cost per label or tag in having an operating individual item self-powered display on each item), while still providing an RFID-cued indication of freshness. Alternatively, the smart labels passing through the readers may be prompted to communicate their freshness data via their respective displays.

Figure 6:
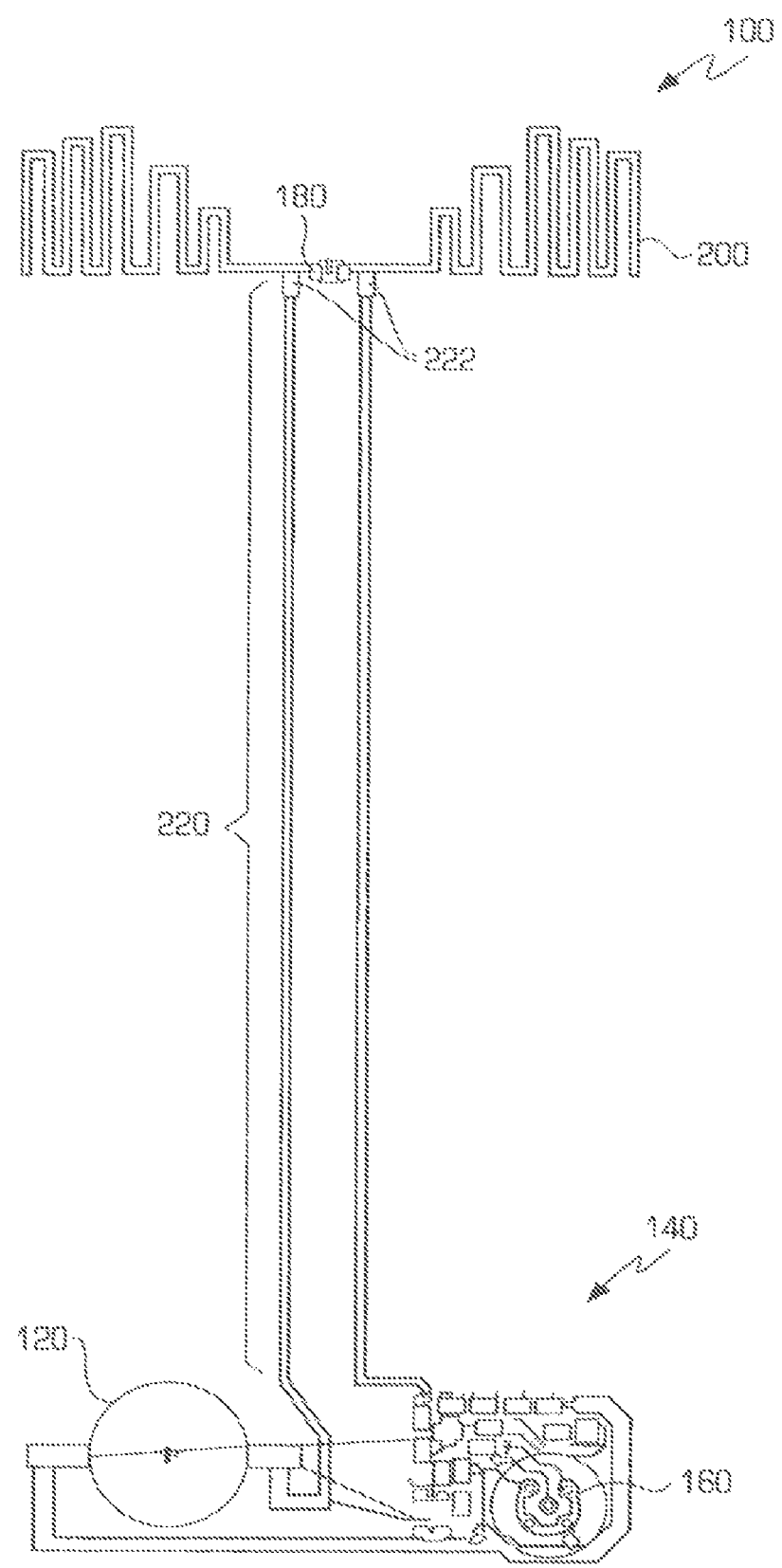
FIG. 6 illustrates one embodiment of an extended smart label or "long tag" that includes a extended interface between the antenna/RFID device and the sensor module, according to the present invention.
Figure 7:
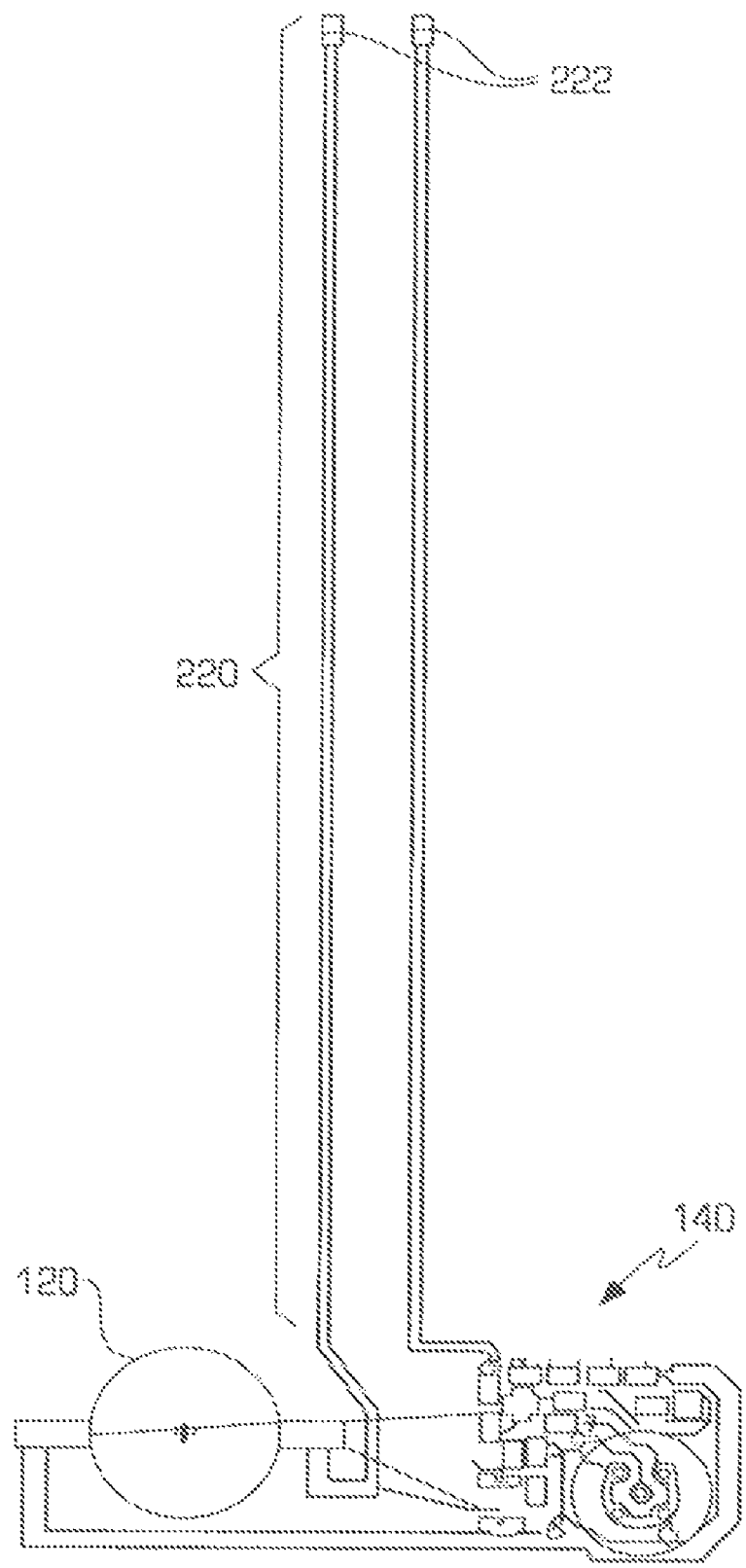
FIG. 7 illustrates an embodiment of an extended smart label or "long tag" that includes a extended interface that can be attached to an antenna/RFID device, including a pair of inductors.
Figure 8:
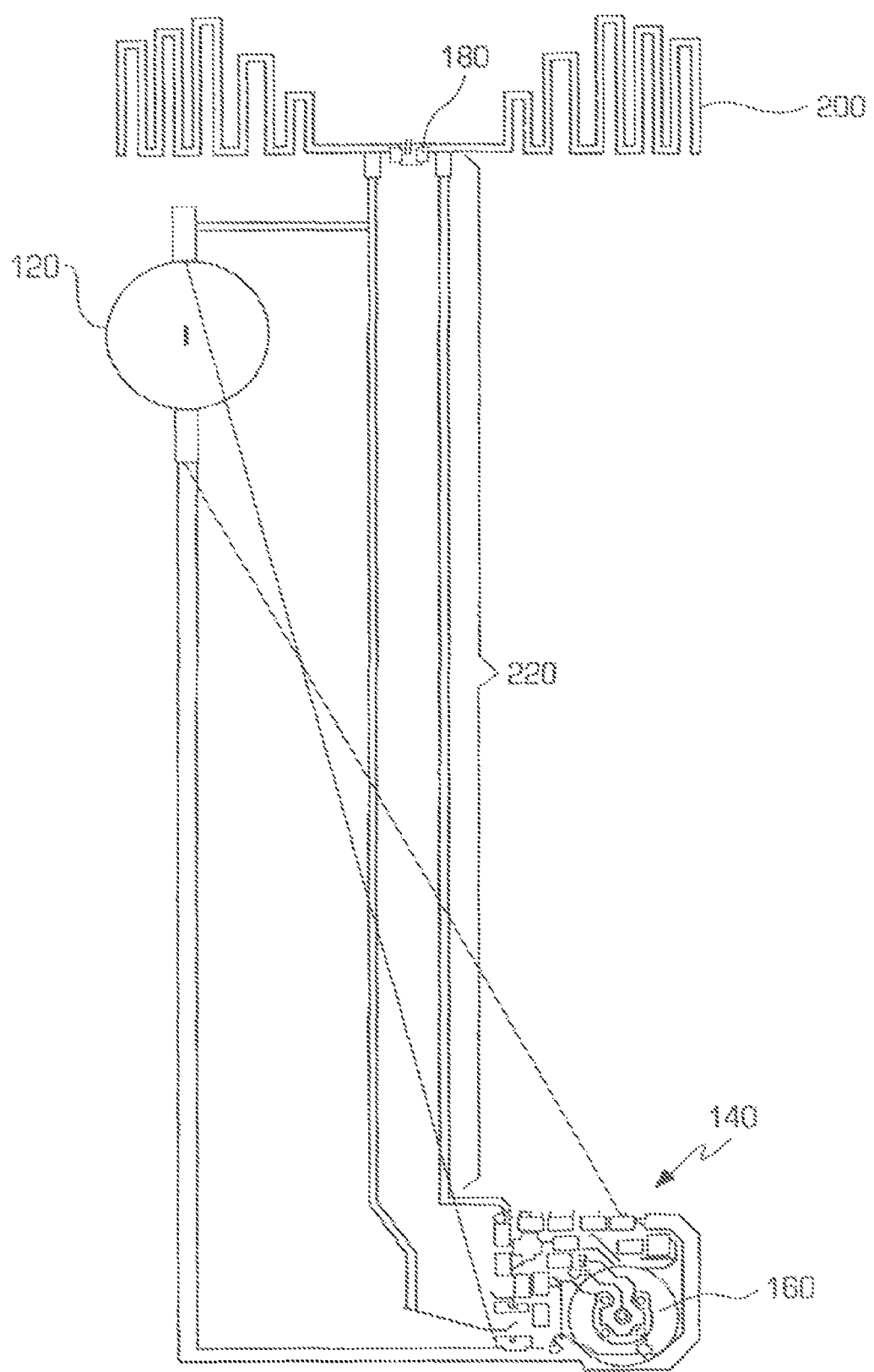
FIG. 8 illustrates another embodiment of an extended smart label or "long tag" that includes a extended interface between the antenna/RFID device and the sensor module, according to the present invention.

FIGS. 6-8 illustrate further embodiments of the inventions, which implement an elongated or extended antenna interface. FIG. 6 shows a smart label 100 including an extended antenna interface 220, which is used to connect the sensor 110 to the RFID chip 180 and antenna 200. The smart label 100 includes a power supply or battery 120, a sensor module 140, and an indicator/switch 160. The sensor module 140 is coupled to and receives electrical power from battery 120, which may comprise a coin cell, flexible battery or other relatively thin power supply. The sensor module 140 may include sensor logic, such as a conventional processor chip and/or circuitry, a memory module for storing data, such as data related to a perishable item or product, freshness data, or data representing one or more predefined temperature-dependent shelf-life trends, and a sensor component adapted to sense and/or detect temperature and/or other product parameters. In alternate embodiments, the sensor module 140 may use external memory, such as the memory contained in an RFID device, to store product data and sensor measurements. The sensor module 140 and RFID chip 180 may be substantially similar in structure and function to sensor module 14 and RFID chip 18, respectively.

The indicator/switch 160 may be communicatively coupled to the sensor module 140 and may receive electrical power from battery 120. The indicator/switch 160 may include a LED, OLED, LCD, light or other visual, audio or otherwise humanly perceivable sensory indicator for providing information regarding a monitored product and/or the "freshness" of the product that is being monitored. For example, the indicator/switch 160 may comprise a multi-colored display (e.g., LED or LCD) adapted to generate a different color based on a particular signal. In one embodiment, the indicator/switch 160 may also include a conventional electrical or capacitive switch for selectively activating the display and/or the sensor module 140, for example, by manually depressing the indicator/switch 160. The indicator/switch 160 may be substantially similar in structure and function to indicator/switch 16 described above.

The smart label 100 includes an elongated or extended antenna interface 220 for communicatively coupling the module 140 to RF transponder 180. The elongated or extended antenna interface 220 is preferably formed using a thin, flexible substrate, which in one embodiment may comprise polyester. In one embodiment, the entire smart label 100 is formed on the flexible substrate. The extended antenna interface 220 can be about several inches to about 10 feet or more in length. Initial labels 100 have been made with example lengths of 10 inches, 24 inches and 30 inches. In one embodiment, the tag is covered front and back with label stock comprising a flexible material, such as paper, tyvec, polyester or the like. The back of the tag may also include an attachment material, such as double-stick tape, Velcro, adhesive or the like at one or both ends. The extended antenna interface 220 includes a pair of inductors 222 that couple the interface to the antenna 200.

In one embodiment shown in FIG. 7, the sensor module 140 and antenna interface 220 are formed separately from the RF transponder 180 and antenna 200. In this embodiment, the sensor module 140 may be selectively and communicatively coupled to the RF transponder by attaching the antenna interface 220 to an RFID antenna 200. This coupling is made using inductors 222. The inductors 222 allow the sensor circuit to connect to the antenna we without detuning it and absorbing energy. The inductors 222 present increasing resistance (impedance) to current flow as the frequency increases (e.g., at low frequency the inductor is like a short circuit at high frequency it is like an open circuit)—so at UHF the inductors act like an open circuit and isolate the antenna 200/RFID chip 180 from the sensor module 140.

In another embodiment shown in FIG. 8, the smart label 100' includes a battery 120 that is disposed in relative close proximity to the antenna 200 and remote from the sensor module 140. In this embodiment, the sensor module 140 can be placed in a container while both the battery 120 and antenna 200 reside outside of the container. This allows for extended battery life, for example, when a thermally cooled container is used. In another embodiment, the display/switch 160 can also be disposed in relative close proximity to the antenna 200 and remote from the sensor module 140.

In the embodiments shown in FIGS. 6-8, the extended interface 220 allows the sensor module 140/140' to signal directly to the RFID chip 180 to update RF memory in the chip. The interface also allows the module 140 to detect the incoming RF data so it knows when not to communicate with the RFID chip 180. The inductors allow for signalling the RFID chip because the frequency required to do this at is only a few tens of kilohertz and at this frequency the inductors look like short circuits. This allows the module to see the RFID chip through the inductors at low frequencies, while the UHF RF frequencies are blocked by the same inductors. Detecting the incoming RF is also possible because the chip produces a varying low frequency signal, which is resolvable at the antenna and again passes through the inductors. The inductors can be formed as a separate or integral component. For example, the inductors can be designed as a coil etched/printed directly on the substrate or be built as a micro strip inductor.

Figure 9:
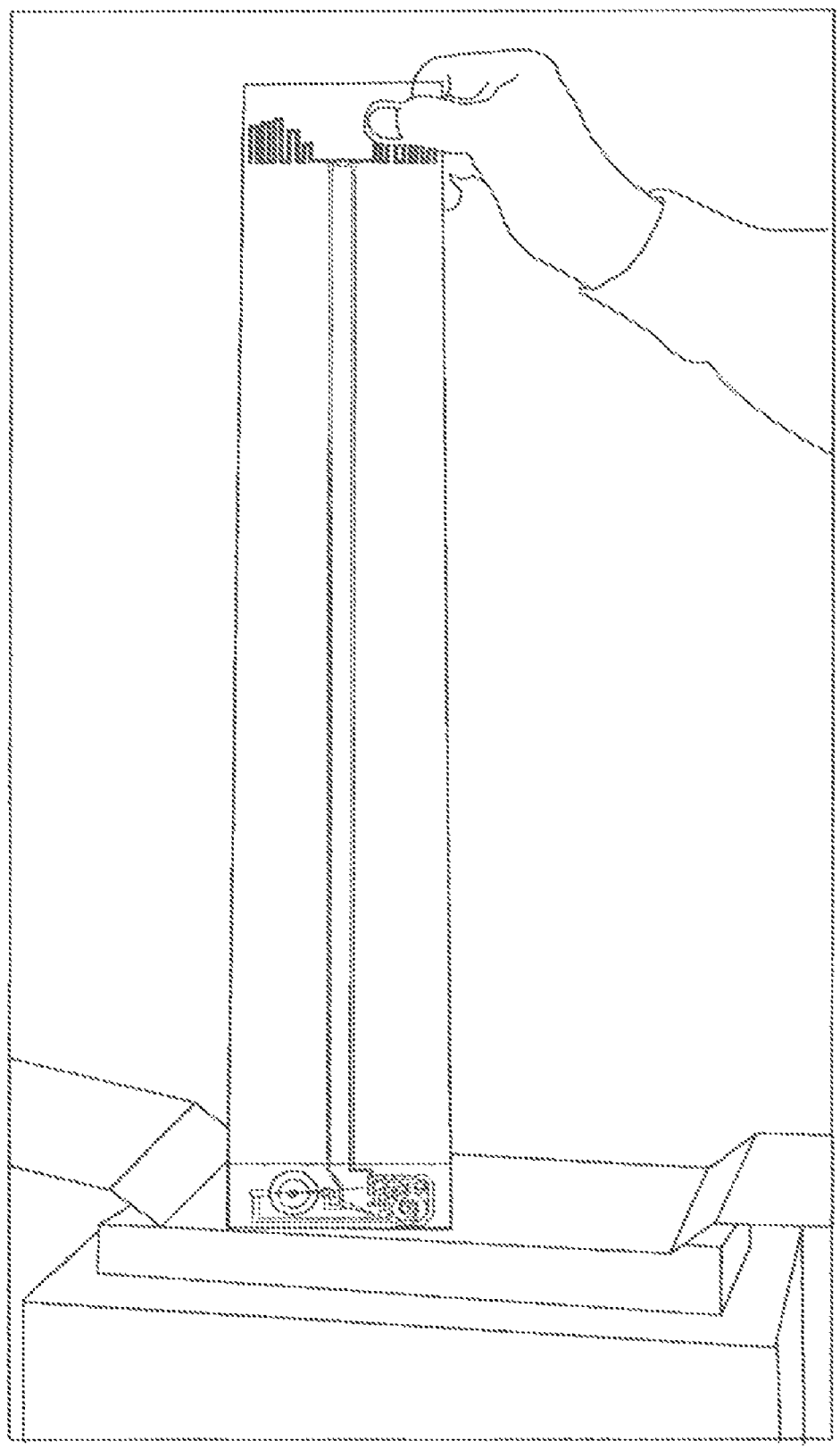
FIG. 9 illustrates the extended smart label or "long tag" shown in FIG. 7 being placed into a container.

In operation, the sensor end of the smart label 100, 100' is placed in the container at the desired location. FIG. 9 shows a smart label 100 being inserted into a container. Once inserted into a container the elongated antenna interface 220 may extend up the inside wall of the container and over the top of the case so that the antenna 200 and RFID chip 180 are located outside of the container. The thin, flexible interface 220, allows the lid to be placed on the container and seal the container. The antenna end of the tag may be attached to the outside wall of the container using the tape, adhesive or Velcro®.

The elongated smart label 100 is particularly useful in applications where it is desirable for the sensor to be inside the package. Placing the sensor module inside a package, such as a cold box, while allowing the antenna to reside outside of the package provides various advantages. For example and without limitation, the long tag allows for optimal sensing and RF reception when used together with temperature sensitive goods that are placed in a container lined with metal and/or containing ice or dry ice packs, which could reduce RFID read performance. In one embodiment, the power supply or battery is placed near the antenna, remote from the sensor module. This allows the battery to reside outside of a container, thereby eliminating a risk that cold or freezing temperatures cause battery voltage to drop. Additionally, a long tag could be used to sense the temperature of cases located in the middle of a pallet.

It should be understood that the inventions described herein are provided by way of example only and that numerous changes, alterations, modifications, and substitutions may be made without departing from the spirit and scope of the inventions as delineated within the following claims.

What is claimed is:

1. A condition monitoring system, comprising:
   a radio frequency transponder module including a RFID chip having a first memory and an antenna;
   at least one sensor module that monitors data related to the condition of a product, and includes a second memory for storing the monitored data; and
   a communication interface that couples the at least one sensor module to the RFID chip;
   wherein the sensor module communicates with the RFID chip by way of the interface and updates the first memory with data related to the product.

2. The condition monitoring system of claim 1 wherein the system is responsive to a radio frequency signal to access data in the second memory, wherein the first and second memory are addressed using a memory address space that combines as least a portion of physical memory in the first memory with at least a portion of physical memory in the second memory.

3. The condition monitoring system of claim 2 wherein the memory address space includes address space in the second memory that is addressed using addresses beyond the physical address space of the first memory.

4. The condition monitoring system of claim 1 wherein the first memory receives and stores commands that are accessible by the sensor module.

5. The condition monitoring system of claim 1 wherein the at least one sensor module determines a current freshness status based on the monitored data.

6. The condition monitoring system of claim 1 wherein the at least one sensor module determines a wear and tear status based on the monitored data.

7. The condition monitoring system of claim 1 wherein the second memory is electrically connected to the antenna.

8. The condition monitoring system of claim 1 wherein the communication interface electrically connects second memory to the radio frequency transponder module.

9. The condition monitoring system of claim 1 wherein the sensor module stores sensor status and alert data in the first memory.

10. The condition monitoring system of claim 1 wherein the communication interface allows the radio frequency reader to bypass the first memory and to establish a direct path to the sensor module.

11. The condition monitoring system of claim 1 further comprising a battery powering the at least one sensor module and operative to enhance a radio frequency signal from the transponder module.

12. The condition monitoring system of claim 1 further comprising a battery powering the at least one sensor module and operative to support initiation of RF communication by the transponder module.

13. The condition monitoring system of claim 8 where the communication interface is longer than one inch.

14. The condition monitoring system of claim 8 where the communication interface between the second memory and the antenna is longer than two inches.

15. The condition monitoring system of claim 14 wherein the communication interface is sufficiently long to permit the radio frequency transponder module to be located at the exterior of a product container and the sensor module to be located inside the product container.

16. The condition monitoring system of claim 15 wherein the communication interface is coupled to a flexible substrate, which is attachable to the product container.

17. The condition monitoring system of claim 1 wherein the RFID chip includes a serial interface.

18. The condition monitoring system of claim 1 wherein the radio frequency transponder module and the at least one sensor module are spaced apart from each other and are attached to a generally planar insulating substrate.

19. The condition monitoring system of claim 1 wherein the communication interface between the transponder module and the at least one sensor module is operative to bypass the first memory and to establish a direct path from an RF reader to the at least one sensor module.

20. The condition monitoring system of claim 1 wherein the at least one sensor module is operative to receive a signal directly from an RF reader by way of the communication interface and to transmit monitored data to the reader.

21. A condition monitoring system as in claim 1 wherein the at least one sensor module can store data and alerts into first memory.

22. A condition monitoring system comprising
   a transponder module including an RFID chip with a first memory and an antenna;
   a sensor module including a condition sensor for monitoring data related to the condition of a product and a second memory for storing the monitored data;
   a communication interface that couples the sensor module with the transponder module, and is operative to allow an RFID reader to retrieve data from the sensor module; and
   an indicator, which is communicatively coupled to the sensor module, which generates non-radio frequency signals according to a signaling scheme that communicates data related to the condition of a product.

23. The condition monitoring system of claim 22 wherein the indicator comprises a light-emitting display.

24. The condition monitoring system of claim 23 wherein the light-emitting display comprises an LED, an OLED or an LCD device.

25. The condition monitoring system of claim 23 wherein the light-emitting display is detectable by one or more detectors comprising one or more vision systems, photo detectors, pattern detectors, or luminance detectors.

26. The condition monitoring system of claim 22 wherein the indicator selectively activates and communicates data related to a product by use of an audio or visual signal under the control of the sensor module.

27. The condition monitoring system of claim 22 wherein the sensor module is operative to selectively activate the indicator in response to a received where-are-you location request.

28. The condition monitoring system of claim 22 wherein the sensor module is operative to selectively update the first memory with data related to a product.

29. The condition monitoring system of claim 22 wherein the second memory is internal to the sensor module.

30. The condition monitoring system of claim 22 wherein the second memory is external to the sensor module.

31. The condition monitoring system of claim 22 wherein the first and second memory are addressed using a memory address space that combines as least a portion of physical memory in the first memory with at least a portion of physical memory in the second memory.

32. The condition monitoring system of claim 31 wherein the memory address space includes address space in the second memory that is addressed using addresses beyond the physical address space of the first memory.

33. The condition monitoring system of claim 22 wherein the first memory receives and stores commands that are accessible by the sensor module.

34. The condition monitoring system of claim 22 wherein the sensor module determines a current freshness status based on the monitored data.

35. The condition monitoring system of claim 22 wherein the at least one sensor module determines a wear and tear status based on the monitored data.

36. The condition monitoring system of claim 22 wherein the signaling scheme generated by the indicator is based on pulse length, a time domain pulse sequence, Morse code or other signaling schemes.

37. The condition monitoring system of claim 1 wherein the at least one sensor module communicates by use of a Bluetooth or Zigbee interface.

* * * * *